US006170197B1

(12) United States Patent
Tyves et al.

(10) Patent No.: US 6,170,197 B1
(45) Date of Patent: Jan. 9, 2001

(54) WINDOW REGULATOR MECHANISM

(75) Inventors: Zinovy Tyves, Windsor (CA); Joseph Frank Carnaghi, Macomb, MI (US)

(73) Assignee: Delphi Technologies, Inc., Troy, MI (US)

( * ) Notice: Under 35 U.S.C. 154(b), the term of this patent shall be extended for 0 days.

(21) Appl. No.: 09/415,155

(22) Filed: Oct. 8, 1999

(51) Int. Cl.[7] .......... B60T 1/16
(52) U.S. Cl. .......... 49/375; 49/358
(58) Field of Search .......... 49/375, 358, 348, 49/349, 350, 351

(56) References Cited

U.S. PATENT DOCUMENTS

| | | | | |
|---|---|---|---|---|
| 4,777,766 | * | 10/1988 | Johnson et al. | 49/351 |
| 4,987,689 | * | 1/1991 | Gold | 49/375 |
| 5,201,144 | * | 4/1993 | Krajenke | 49/351 |
| 5,497,578 | * | 3/1996 | Wautelet et al. | 49/349 |
| 5,513,468 | * | 5/1996 | Diestelmeier | 49/375 |
| 5,647,171 | * | 7/1997 | Wirsing et al. | 49/502 |
| 5,692,273 | * | 12/1997 | Rodde | 24/541 |
| 5,765,310 | * | 6/1998 | Gold | 49/375 |
| 5,771,534 | * | 6/1998 | Church | 49/375 |
| 5,848,496 | * | 12/1998 | Bertolini et al. | 49/352 |
| 5,907,927 | * | 6/1999 | Lieb et al. | 49/375 |

* cited by examiner

*Primary Examiner*—Daniel P. Stodola
*Assistant Examiner*—Curtis A. Cohen
(74) *Attorney, Agent, or Firm*—Kathryn A. Marra

(57) ABSTRACT

A sash/cam channel member is extruded from a plastic (e.g., thermoplastic) material and includes the same cross section whether the member is used in a sash-type application or a cam-type application. In one embodiment, the sash/cam channel member includes a channel formed therein for receiving a coupling member, which is attached to a moveable arm of the assembly, and a pair of opposing fork members. The windowpane is received between the pair of opposing fork members to produce a frictionally fit therebetween. The inner surfaces of the channel have a low friction layer (coating) formed thereon so that the coupling member slidingly travels within the channel is a near frictionless manner. Similarly, the inner surfaces of the pair of fork members have a high friction layer (coating) disposed thereon for increased gripping and coupling of the windowpane.

13 Claims, 3 Drawing Sheets

FIG. 1
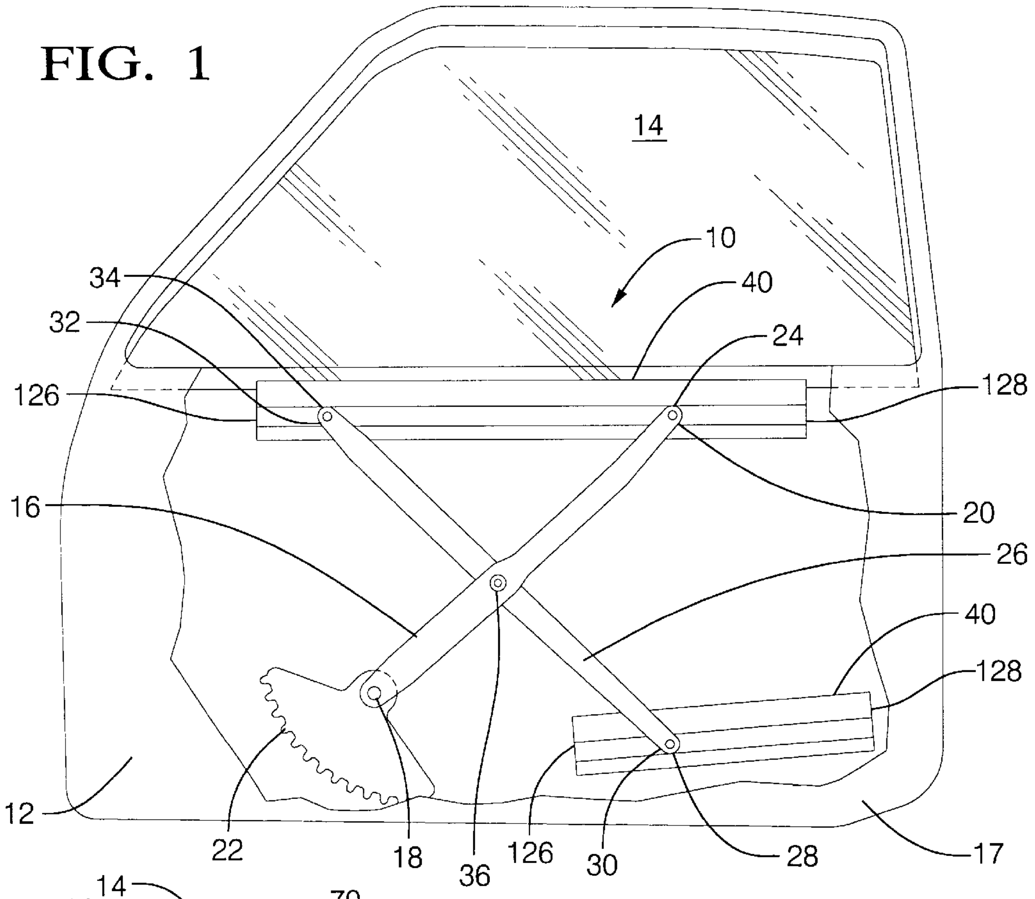
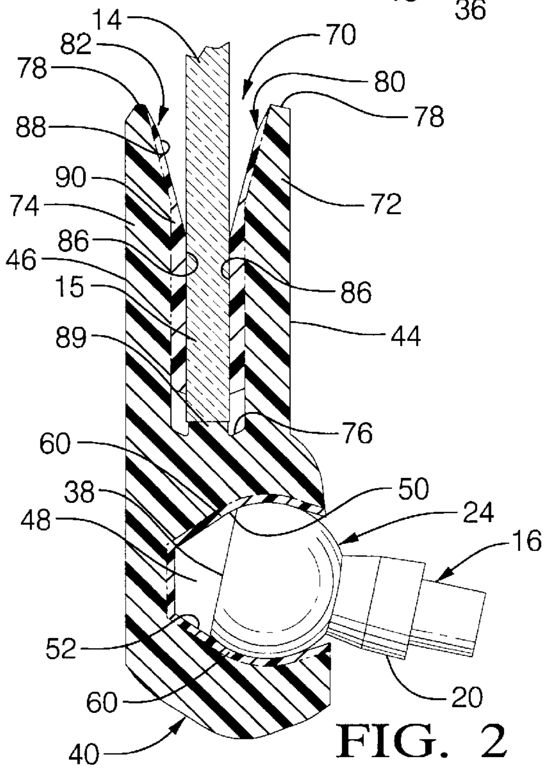
FIG. 2
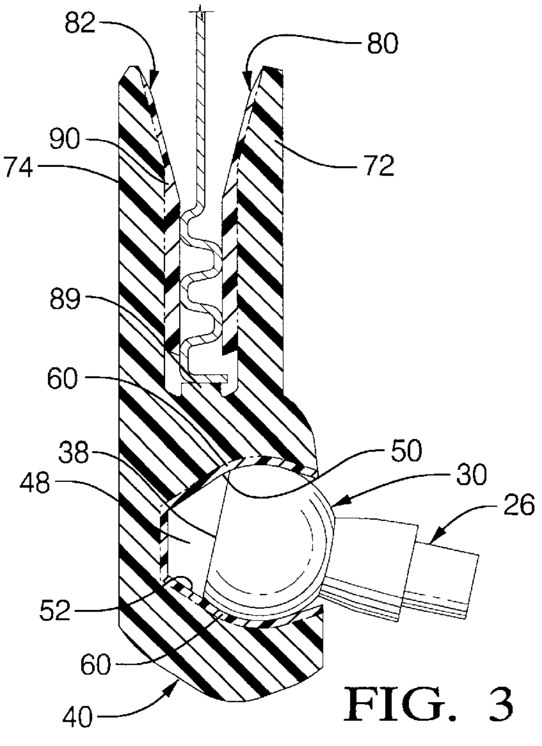
FIG. 3

WINDOW REGULATOR MECHANISM

TECHNICAL FIELD

The present invention relates generally to a vehicle window regulator mechanism and, more particularly, to an improved window regulator assembly including extruded sash and cam channel members constructed of the same cross section and coated with a low friction slip coating.

BACKGROUND OF THE INVENTION

Window regulators including a cross-arm regulator are used in a vehicle door to facilitate a driver or passenger control over the positioning of a windowpane in the door of the vehicle. These regulators are typically comprised of metal assemblies in which one end of a pivotable lift arm mounts a gear sector, which is driven by a pinion. The other end of the lift arm mounts a slider which slides in a metal sash channel that holds the window pane as the arm is raised and lowered to correspondingly raise and lower the window pane. The cross arm regulator also utilizes a force-stabilizing balancing arm pivotally attached to the lift arm. The balancing arm has sliders mounted on both ends, one slides in the metal sash channel and the other slides in a metal cam channel. The balancing arm scissors on the lift arm to equalize the forces tending to tilt a window as it is raised and lowered by the lift ann. The lift arm is driven Up and down by a driving pinion, which engages a sector mounted on the inner end of the lift arm.

There are numerous components that make up the cross-arm regulator including but not limited to, metal sash and cam channels, lifting and balancing arms, a motor, gears and a pinion as well as a number of fasteners, glass retainers and sliders. Conventionally the metal sash and cam channels have been fabricated by different manufacturing processes and thereby require lubrication in order to reduce the sliders linear motion friction.

Due to ongoing requirements for decreasing the weight of vehicle components and making reductions in manufacturing time and processes, it is desirable to provide a window regulator assembly having a minimal number of components and a reduction in manufacturing time while maintaining superior window adjustment and control.

SUMMARY OF THE INVENTION

Advantageously, the present invention provides a window regulator assembly comprising a sash channel and a cam channel extruded from a plastic (e.g., thermoplastic) material having the same cross section. In other words, a sash/cam channel member is provided where the single extruded member is intended for use as both a sash channel member for coupling to a windowpane and a cam channel for coupling to a door panel or door module. In a first embodiment, the sash/cam channel member includes a channel formed therein for receiving a coupling member, which is attached to a moveable arm of the assembly, and a pair of opposing fork members. The windowpane is received between the pair of opposing fork members to produce a frictionally fit therebetween and thus be securely coupled to the windowpane. In one aspect of the invention, the inner surfaces of the channel have a low friction layer (coating) disposed thereon so that the coupling member slidingly travels within the channel is a near frictionless manner. Similarly, the inner surfaces of the pair of fork members have a high friction layer (coating) disposed thereon for increased gripping and coupling of the windowpane.

Preferably, the sash/cam channel member is formed using a single common extrusion process and therefore the high and low friction layers are co-extruded with the base portion of the sash/cam member. Because three different plastic materials are used to produce the sash/cam channel member of the first embodiment, it is referred to as a tri-extruded member.

Advantageously, conventional sliders and lubrication are eliminated because the use of the low friction material on the inner surfaces of the channel permits coupling and slider members to travel therein with near frictionless movement. Further reductions in the number of components needed for the window regulator mechanism results from the elimination of retainers and rubber seals used to mount the windowpane into the plastic sash channel member. During assembly the windowpane is press fit into the sash channel so that the high friction layer grips the glass windowpane eliminating the need for additional mounting components and hardware.

In a second embodiment, the sash/cam channel member has a beveled retainer lip in place of the pair of fork members. In this embodiment, window retainers snap-fit with the beveled retainer lip to provide a coupling between the windowpane and the sash/cam channel member. In this embodiment, the sash/cam channel member is referred to as a di-extruded member because the use of the low friction layer on the inner surfaces of the channel is retained, while the use of the high friction layer is eliminated because the pair of fork members are likewise eliminated. In a third embodiment, the sash/cam channel member includes a plurality of integral clips which are received within complementary openings formed in a door panel or door module in a snap-fit manner. Preferably, the plurality of clips are formed during the common extrusion process for forming the sash/cam channel member itself.

In accordance with the preferred embodiment of the present invention, there is a significant material and manufacturing cost savings. Additional benefits include the desirable reduction in weight of the assembly due to the elimination of parts and usage of light weight materials.

The above and other objects and advantages of the invention will be apparent from the following description, the accompanying drawings and the appended claims.

BRIEF DESCRIPTION OF THE DRAWINGS

The present invention will now be described, by way of example only, with reference to the accompanying drawings, in which:

FIG. 1 is a cross-sectional side elevation of a cross-aim window regulator according to the present invention illustrated with a window pane in the raised position;

FIG. 2 is a cross-sectional end view of a sash/cam channel member of a first embodiment embodying the present invention where the member is used as sash channel member;

FIG. 3 is a cross-sectional end view of the sash/channel member of FIG. 2 used as a cam channel member;

DETAILED DESCRIPTION OF THE PREFERRED EMBODIMENT

Figure 4:
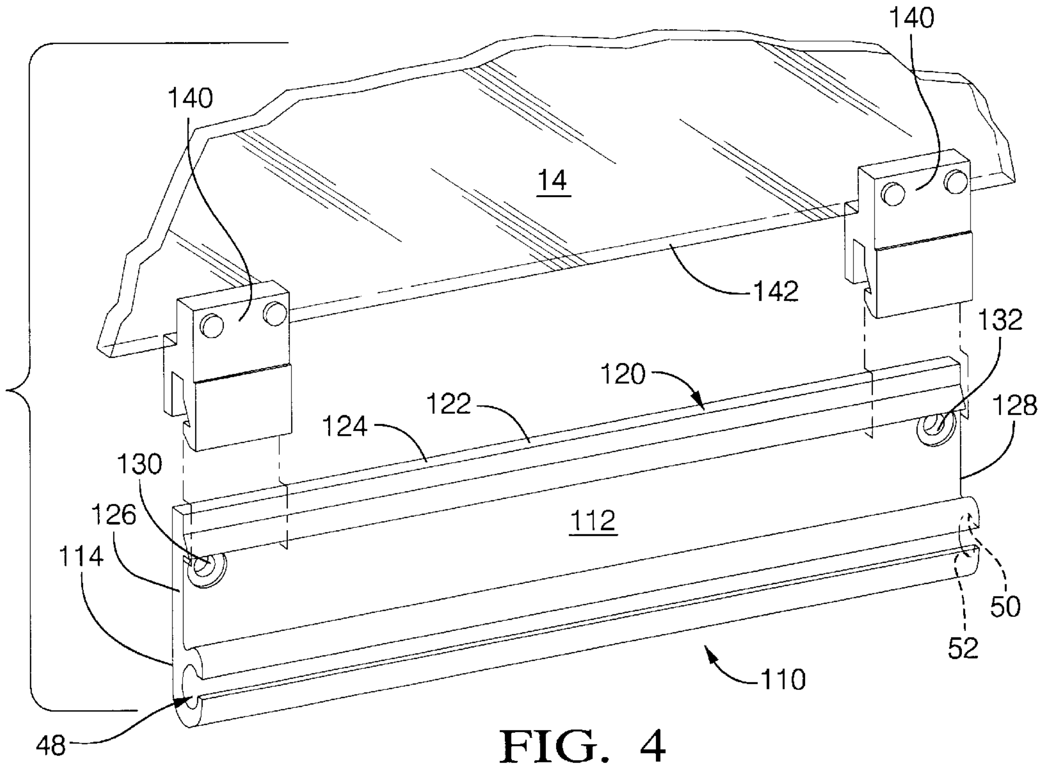
FIG. 4 is an exploded front perspective view of a sash/cam channel member of a second embodiment according to the present invention coupled to a windowpane.

Referring to FIGS. 1–3, a window regulator mechanism according to a first embodiment is generally indicated at 10. In the cross-sectional side elevational view of FIG. 1, the window regulator assembly 10 is shown as being disposed in a door 12. Door 12 includes a windowpane (e.g. glass panel) 14 which is shown in FIG. 1 in a raised position. According to the present invention, the window regulator mechanism 10 comprises a lift arm 16 having a first end 18 and an opposing second end 20, where the first end 18 is pivotally mounted to a sector gear 22 and the second end 20 is mounted to a first lifting ball 24. The window regulator mechanism 10 further includes an balancing arm 26 having a first end 28 mounted to an balancing ball 30 and an opposing second end 32 mounted to a second lifting ball 34. The balancing arm 26 pivotally connects to the lift arm 16 at a point 36 which preferably comprises a midpoint of the lifting arm 16. As best shown in FIG. 2, the first lifting ball 24 comprises a spherical member having a truncated end 38 opposite where the first lifting ball 24 is coupled to the lift arm 16. It being understood that the balancing ball 30 and the second lifting ball 34 have similar configurations as the first lifting ball 24 shown in detail in FIG. 2. The lift arm 16 and the balancing arm 26 are each coupled to a sash/cam member 40. Whether sash/cam member 40 acts as a sash channel member or a cam channel member depends on the location of the sash/cam member 40. More specifically and as is know in the art, the sash channel member 40 is intended to engage the windowpane 14 and is typically located above the cam channel member 40, which is mounted to a lower portion 17 of the door 12. As will be described in greater detail hereinafter, according to one aspect of the present invention, the sash/cam channel member 40 is intended for use in both as a cam channel and as a sash channel. In other words, the cross-section of the member 40 is the same whether the member 40 acts as a cam channel or a sash channel in the window regulator mechanism 10.

FIG. 2 is a cross-sectional side elevational view of cam/sash channel member 40 according to the first embodiment of the present invention. The sash/cam channel member 40 has a body 42 having a first surface 44 and an opposing second surface 46. Sash/cam channel member 40 has a channel 48 formed therein. In the exemplary embodiment, channel 48 is defined by a first arcuate surface 50 and an opposing second arcuate surface 52. T he first and second arcuate surfaces 50, 52 are a part of body 42 and extend longitudinally along the sash/cam channel member 40 so that an open-ended channel 48 is formed therein. According to one aspect of the present invention, the first and second arcuate surfaces 50, 52 are coated with a low friction layer 60. In the preferred embodiment, the low friction layer 60 is formed on both the first and second arcuate surfaces 50, 52 during the extrusion process which is also used to form the sash/cam channel member 40. In other words, the low friction layer 60 and the remaining portions of the sash/cam channel member 40 are preferably formed during a common extrusion process.

The sash/cam channel member 40 further includes a window engaging slot 70 which is defined by a first fork 72 and an opposing second fork 74. The first fork comprises a portion of the first surface 44 and the second fork comprises a portion of the second surface 46. In the exemplary embodiment, the first and second forks 72 and 74 are integral to the body 42 at first ends 76 thereof and extend upwardly in a direction away from the channel 48. More specifically, the first fork 72 is integral to the body 42 above the first arcuate surface 50. Each of the first and second forks 72, 74 also has an opposing second end 78. Inner surfaces 80, 82 of the first and second forks 72, 74, respectively, have a planar section 86 and a beveled section 88 which is angled outwardly relative to the planar section 86. The planar sections 86 are proximate and extend to a bottom surface 89 which extends between the planar sections 86 at the first ends 76 of the first and second forks 72, 74. Accordingly, the beveled sections 88 extend to the second ends 78 of the first and second forks 72, 74. According to the present invention, the inner surfaces 80, 82 of the first and second forks 72, 74, respectively, are coated with a high friction layer 90. High friction layer 90 comprises an extruded layer formed of a plastic material which has enhanced or high friction characteristics for frictionally gripping and retaining a member which is disposed between the high friction layers 90 formed on each of the first and second surfaces 80, 82, respectively. High friction layer 90 is also preferably formed during a common extrusion process in which the sash/cam channel member 40 is formed in its entirety.

As shown in FIG. 2, sash/cam channel member 40 is used as a sash channel member. In this embodiment, the first and second forks 72, 74 are separated from one another by a predetermined distance which is sufficiently sized to that the windowpane 14 is received therebetween in a press fit manner. A bottom portion 15 of the windowpane 14 seats against the bottom surface 89 to properly locate the windowpane 14 within the sash channel member 40. It being understood that the predetermined distance is selected so that the width of the windowpane 14 is slightly larger than the distance between the first and second forks 72, 74. Thus, the windowpane 14 is in intimate contact with the high friction layer 90. The high friction layer 90 serves to securely position and retain the windowpane 14 to the inner surfaces 80, 82 of the first and second forks 72, 74. Windowpane 14 is thus securely frictionally retained between planar sections 86 of the inner surfaces 80, 82. Advantageously, the formation of first and second forks 72, 74 integral to the remaining portions of member 40, including the channel 48, and the use of high friction layer 90 provides a window retaining device which eliminates the need or use of window retainers which are conventionally used to lockingly connect a portion of the windowpane 14 to the sash channel member. This simplifies the overall assembly process and reduces cost due to the elimination of several parts which typically were needed in conventional window regulator mechanisms.

Referring to FIG. 3. Similarly, when the sash/cam channel member 40 is used as a cam channel member, an inner door panel 100 is disposed and retained between the first and second forks 72, 74. A bottom portion 102 of the inner door panel 100 seats against the bottom surface 89 to properly locate the inner door panel 100 within the sash channel member 40. The high friction layer 90 serves to securely position and retain the inner door panel 100 to the inner surfaces 80, 82 of the first and second forks 72, 74. Inner door panel 100 is thus securely frictionally retained between planar sections 86 of the inner surfaces 80, 82. This eliminates the need for securing members (e.g., clips) which are conventionally used to retain the inner door panel 100 to the cam channel members of the prior art. Likewise, this simplifies the assembly process relative to the cam channel member and reduces cost. Cam channel member 40 and more specifically, channel 48 thereof, slidingly receives balancing ball 30 which travels therein with ease due to low friction layer 60.

Preferably, the body 42, the low friction layer 60, and the high friction layer 90 are formed of a plastic material. It being understood that each of the body 42, the low friction layer 60, and the high friction layer 90 are preferably formed of a different plastic material having the desired characteristics. Accordingly, when the sash/cam channel member 40 is formed of three different plastic materials, the sash/cam channel member 40 is referred to as a tri-extruded member.

Figure 5:
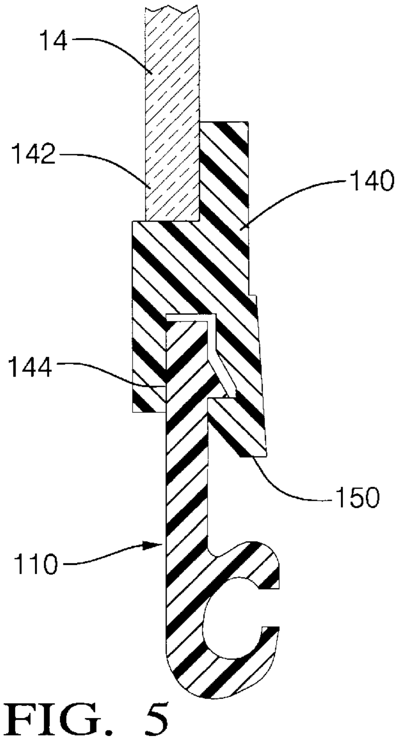
FIG. 5 is a cross-sectional side elevational view of the sash/cam channel member of FIG. 4 coupled to the windowpane.

Referring now to FIGS. 4–5 in which a sash/cam channel member according to a second embodiment is illustrated and generally indicated at 110. Sash/cam channel member 110 is similar to sash/channel member 40 in that sash/channel member 110 includes the channel 48 defined by first and second arcuate surfaces 50, 52, respectively. Sash/cam channel member 110 includes a first surface 112 and an opposing second surface 114. Preferably, second surface 114 comprises a planar surface which permits the sash/cam channel member 110 to be mounted flush against another planar object under particular desired applications. Formed on first surface 112 and extending outwardly therefrom is a beveled retaining lip generally indicated at 120. Beveled retaining lip 120 includes a beveled surface 122 angled outwardly relative to first surface 122 at proximate first end 124 of the sash/cam channel member 110. The beveled surface 122 extends longitudinally along the length of the sash/cam channel member 110 from a first side 126 to a second side 128 thereof. A shoulder 130 is formed by and partially defined by beveled surface 122. Shoulder 130 and beveled surface 122 serve as a retaining member which snapfittingly locks the sash/cam channel member 110 with another member.

When sash/cam channel member 110 is used as a sash channel member, the windowpane 14 is securely coupled to the sash channel member 110 by a plurality of window retainers 140. The plurality of window retainers 140 are fixedly secured at one end to a bottom portion 142 of windowpane 14. The other end of the plurality of window retainers 140 includes a channel 144 having a complementary shape as the beveled retaining lip 120 and a beveled lip. The plurality of window retainers 140 are disposed about the sash channel member 110 so that the plurality of window retainers 140 mate with the beveled retaining lip 120 in a snap-locking manner. Each of the plurality of window retainers 140 includes a beveled retaining lip 150 which preferably has a complementary shape as the beveled retaining lip 120 of the sash channel member 110. The complementary shape of beveled retaining lips 120, 150 mate with each other to snap-lockedly couple the sash channel member 110 to the plurality of window retainers 140.

Sash/cam channel member 110 also includes at least one opening 132 formed therein. The at least one opening 132 is formed proximate the first and second sides 126, 128 and slightly below the shoulder 130. When sash/cam channel member 110 is used as a cam channel member, the at least one opening 132 serves as means for attaching the cam channel member 110 to an inner door panel (for example inner door panel 100 shown in FIG. 3). For example, a suitable fastener (not shown) may extend through the at least one opening 132 to attach the cam channel member 10 to the inner door panel. For example, a pin may be used to attach the cam channel member 110 to the inner door panel by extending the pin through the at least one opening 132 into a retaining opening (not shown) formed in the inner door panel thus providing a rotational pivot point for a cam channel adjustment which is achieved by a simple shim installed at the other end of the cam channel member 110 before press fitting the cam channel member 110 into an edge of the inner door panel.

In the second embodiment shown in FIGS. 4–5, the sash/cam channel member 110 comprises a di-extruded member in that the first and second arcuate surfaces 50, 52 include the low friction layer 60 formed thereon. As in the first embodiment, the low friction layer 60 is preferably formed on the first and second surfaces 50, 52 during the extrusion process which is also used to form the sash/cam channel member 40. In other words, the sash/cam channel member 110, including the low friction layer 60, is preferably formed by a single extrusion process in which the low friction layer 60 is applied only to the first and second arcuate surfaces 50, 52. Thus, the sash/cam channel member 110 is formed from two different extruded materials (e.g. plastics) and therefore is referred to as a di-extruded member. Unlike in the first embodiment, the high friction layer 90 is not used in the second embodiment because the windowpane 14 or inner door panel or the like is mechanically retained to the sash/cam channel member 110 using known connector hardware.

Figure 8:
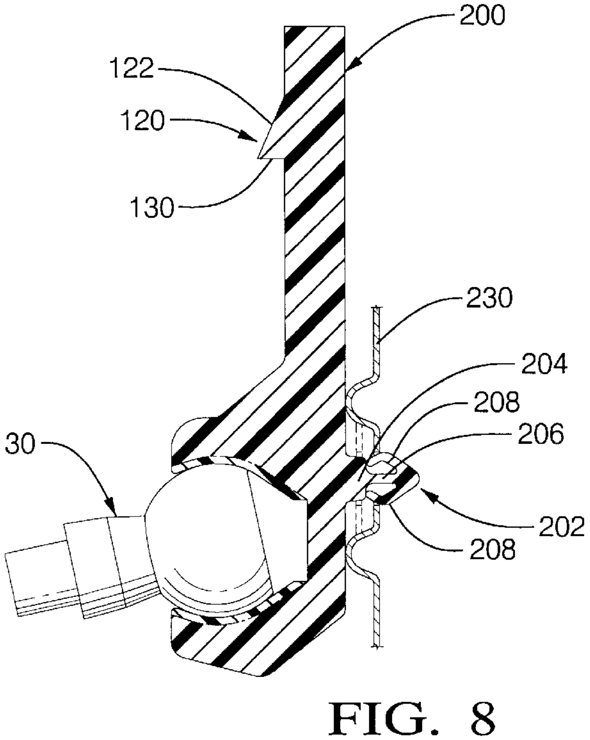
FIG. 8 is a cross-sectional side elevational view of the sash/cam channel mounted to the door panel/module as shown in FIG. 7 coupled to a balance or lift arm.
Figure 6:
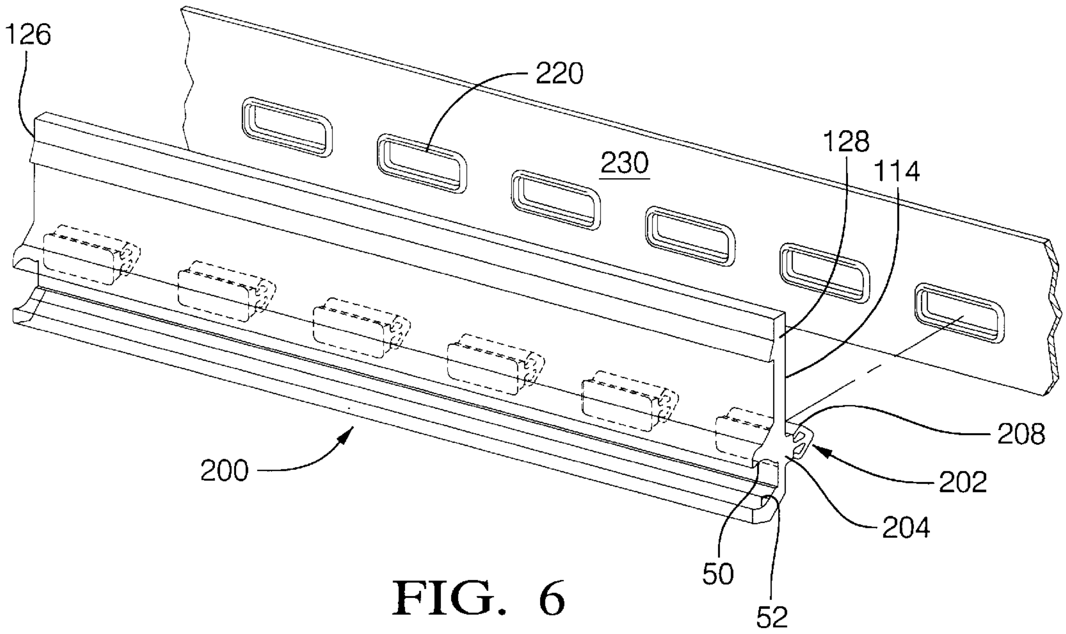
FIG. 6 is an exploded front perspective view of a sash/cam channel member of a third embodiment according to the present invention mounted to a door panel/module.
Figure 7:
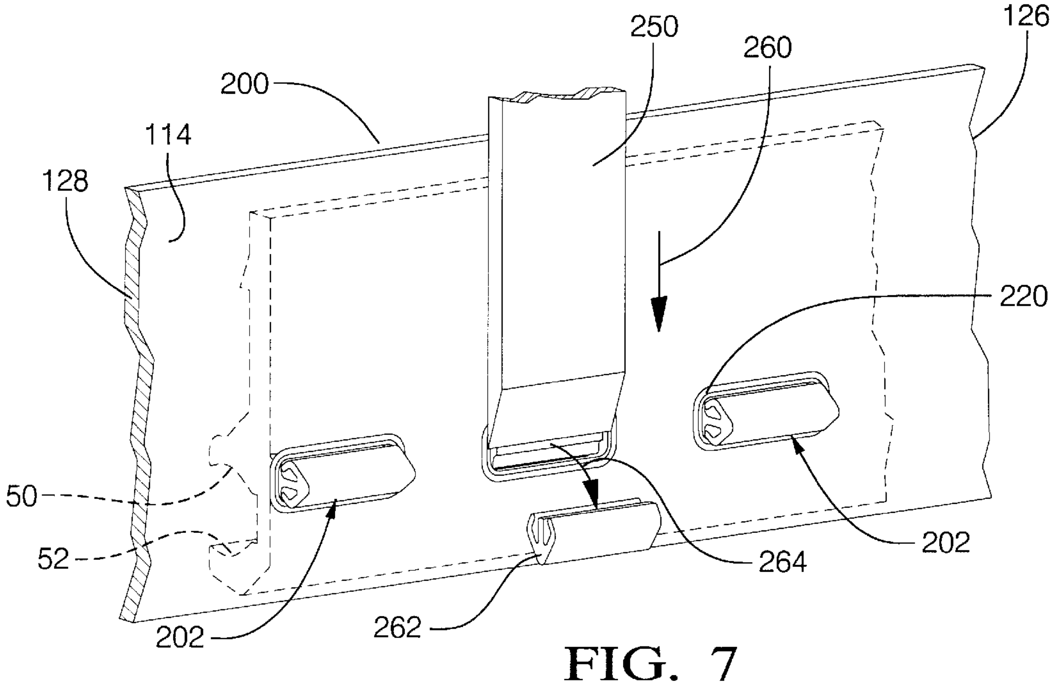
FIG. 7 is rear perspective view of the sash/cam channel mounted to the door panel/module of FIG. 6.

Referring now to FIGS. 6–8 in which a sash/cam channel member according to a third embodiment of the present invention is illustrated and generally indicated at 200. Sash/cam channel member 200 is similar to sash/cam member 110 with the exception that sash/cam channel member 200 includes a plurality of clips 202 which extend outwardly away from the second surface 114. Each of the plurality of clips 202 includes a base portion 204 and a center beam 206 which extends outwardly from the base portion 204. At an end opposite the base portion 204, the center beam 206 is integrally connected to first and second beveled side members 208 which extend downwardly towards the base portion 204 at an angle relative to the center beam 206. The center beam 206 is preferably substantially perpendicular to the base portion 204 and thus, the clip 202 may be referred to as a "W-clip". Because the plurality of clips 202 are preferably integrally formed with the sash/cam channel member 110 during a common single extrusion process, each clip 202 comprises a resilient member which is intended to snap-fittingly mate with openings 220 formed in a door module 230 or the like. This permits the sash/cam channel member 200 to easily be mounted to the door module 230 by simply aligning and inserting the plurality of clips 202 with the openings 220 and press-fitting the sash/cam channel member 200 until the plurality of clips 202 snap-fits within the door module 230. In such a design, the co-extruded plurality of clips 202 provides pull-in attachment forces and its bottom embossment would locate the sash/cam channel 200 in up-down position and assumes all loads from the window regulator mechanism 10 (FIG. 1). Once the plurality of clips 202 are snap-fittingly locks with the door module 230, the ends of the plurality of clips 202 may be broken free from the sash/cam channel member 200 by any number of suitable tools 250. For example, tool 250 is directed in a downward direction, indicated generally by arrow 260, and strikes the plurality of clips 202 causing a portion 262 to be broken away, as generally indicated by arrow 264.

FIG. 8 is a cross-sectional view of sash/cam channel 200 snap-lockedly attached to door module 230. This Figure depicts the sash/cam channel 200, and more specifically the plurality of clips 202, prior to the plurality of clips 202 being subjected to the force of the tool 250 (FIG. 7) to break a portion of the plurality of clips 202 away.

Referring now to FIGS. 1–8. For the purpose of illustration only, the assembly of the window regulator mechanism 10 will be described with reference to sash/cam channel member 40. It being understood that the assembly of sash/cam channels of other embodiments of the present invention is similar to the exemplary assembly process described hereinafter. In assembling the window regulator mechanism 10, the first lifting ball 24 is slidingly inserted into channel 48 at one of sides 126 and 128 of the sash channel member 40. Because of the shape of the first lifting ball 24, including its generally spherical shape, the first lifting ball 24 is retained within the channel 48. The positioning of the windowpane 14 prevents the first lifting ball 24 from disengaging from the channel 48. In a like manner, the second lifting ball 34 slidingly engages the channel 48 of sash channel member 40. As shown in FIG. 1, the second lifting ball 34 is preferably inserted into an opposite side 126, 128 as the first lifting ball 24. Because the first and second arcuate surfaces 50, 52 of the channel 48 are coated with a low friction layer 60, the first and second lifting balls 24, 34 travel within channel 48 in a near frictionless manner. Accordingly, a lubricant is not needed to lubricate channel 48 sufficiently to reduce linear motion friction. Conventional slider assemblies which engaged and traveled within the channels of prior art sash/cam channel members generally required that the sliders be lubricated. Thus, the present invention advantageously does not require the use of lubricants to achieve proper liner motion of the first and second lifting balls 24, 34 within the channel 48.

The balancing ball 30 serves to couple the balancing arm 26 to the cam channel member 40 disposed below the sash channel member 40 in the door regulator mechanism 10. As in the case of the first and second lifting balls 24, 34, the balancing ball 30 slidingly engages channel 48 formed in the cam channel member 40 by inserting balancing ball 30 into one of sides 126, 128 of the cam channel member 40. Because cam channel member 40 has the same cross-sectional shape as sash channel member 40, the first and second arcuate surfaces 50, 52 of the channel 48 are coated with the low friction layer 60. Accordingly, this permits the first and second lifting balls 24, 34 to travel within channel 48 in a near frictionless manner. Accordingly, a lubricant is not needed to lubricate channel 48 of cam channel member 40.

As previously mentioned, conventional cross arm window regulator mechanisms typically use metal cam and sash channels which must be lubricated in order to reduce a slider linear motion friction. Usually, the two channels are made by two different manufacturing processes. For example, an extrusion or rolling process is used to form the sash channels. The cam channels are typically formed by a rolling process. A rubber insert is disposed within the sash channel to provide a press fit attachment to the glass or special glass retainers are made for the sash to glass attachment provisions. The cam channel is attached to a door inner or module carrier by two positive fasteners on both ends of the channel with provisions for an adjustment.

The present invention provides a simplified channel member 40 for use in the window regulator mechanism 10, wherein the channel member 40 acts both as a sash channel member 40 and as a cam channel member 40. Thus, a single extrusion process may be used to manufacture the sash/cam channel member 40. The advantages thus lie in the commonality of the sash and cam channel members 40. In one exemplary embodiment, the same tri-extruded thermoplastic sash and cam channel members 40 with common cross-section are used in both sash and cam type applications. In addition, the incorporation of the high friction layer 90 and low friction layer 60 into the same extrusion process in which the main body 42 of the sash/cam channel member 40 is formed offers advantages previously-mentioned hereinbefore.

The present invention thus reduces cost by eliminating metal channels, fasteners, window retainers, sliders, lubrication, etc. Furthermore, because the sash/cam channel member according to the present invention functions as both a sash or cam channel member in the window regulator mechanism, tooling costs are reduced because a single common tool may be used in the extrusion process for forming the sash/cam channel member.

It will be understood that a person skilled in the art may make modifications to the preferred embodiment shown herein within the scope and intent of the claims. While the present invention has been described as carried out in a specific embodiment thereof, it is not intended to be limited thereby but is intended to cover the invention broadly within the scope and spirit of the claims.

What is claimed is:

1. A sash/cam channel member for use in a window regulator mechanism, comprising:

an elongated member including:

a base portion formed of a first material;

a channel formed in the base portion, the channel being defined by first and second walls, wherein inner surfaces of the first and second walls have a first layer of material secured thereto; and first and second fork members defining a slot therebetween, the first and second fork members having inner surfaces which each include a second layer of material secured thereto, wherein the first material, the first layer of material, and the second layer of material comprise different materials.

2. The sash/cam channel member as set forth in claim 1, wherein the first material comprises a thermoplastic.

3. The sash/cam channel member as set forth in claim 1, wherein the elongated member comprises an extruded plastic member and the first and second layers are co-extruded with the first material of the base portion when the elongated member is formed.

4. The sash/cam channel member as set forth in claim 1, the elongated member is used as a sash channel member and a windowpane is received and secured within the slot formed between the first and second fork members, the first and second fork members serving to clamp the windowpane.

5. The sash/cam channel member as set forth in claim 1, wherein the first layer comprises a low friction material which permits a first member to slidingly travel within the channel.

6. The sash/cam channel member as set forth in claim 5, wherein the low friction material reduces liner motion friction between the first member and the low friction material.

7. The sash/cam channel member as set forth in claim 1, wherein the second layer comprises a high friction material which frictionally engages a second member disposed in the slot.

8. The sash/cam channel member as set forth in claim 1, wherein the elongated member has a first cross-section suitable for use as a sash channel member coupled to a windowpane and as a cam channel member coupled to a door panel or module.

9. The sash/cam channel member as set forth in claim 1, wherein a sash/cam charnel member is adapted to be attached to a windowpane by press-fitting the windowpane between first and second fork members so that a secure frictional fit results therebetween, the first layer acting to frictionally engage surfaces of the windowpane.

10. A sash/cam channel member for use in a window regulator mechanism, comprising:

an elongated member including:

a base portion;

an arcuate channel formed in the base portion, the arcuate channel having an inner surface with a layer of low friction material being secured to the base portion within the arcuate channel for permitting a member to slidingly travel within the arcuate channel; and first and second fork members defining a slot therebetween, the first and second fork members having inner surfaces which each include a layer of high friction material secured thereto for frictionally engaging a windowpane between the first and second fork members, wherein the base portion is formed of a material different than the low and high friction materials.

11. The sash/cam channel member as set forth in claim 10, wherein the low and high friction material layers are formed during the formation of the base portion.

12. The sash/cam channel member as set forth in claim 10, wherein each of the first and second fork members has a beveled upper edge, the second layer of material being disposed on the beveled upper edge so that a space is formed between the second layer and the windowpane when the windowpane is securely positioned between the first and second fork members.

13. The sash/cam channel member as set forth in claim 10, wherein the arcuate channel is generally U-shaped.

* * * * *